United States Patent Office 3,004,005
Patented Oct. 10, 1961

3,004,005
VULCANISATION ACCELERATORS FOR VULCANISABLE ELASTOMERS
Hugo Malz, Leverkusen, Theo Kempermann, Koln-Lindenthal, Heinz Esser, Koln-Sulz, and Friedrich Lober, Leverkusen-Bayerwerk, Germany, assignors to Farbenfabriken Bayer Aktiengesellschaft, Leverkusen, Germany, a corporation of Germany
No Drawing. Filed Jan. 9, 1958, Ser. No. 707,868
Claims priority, application Germany Jan. 9, 1957
14 Claims. (Cl. 260—79)

This invention relates to an improved vulcanisation process; more particularly it is concerned with novel vulcanisation accelerators.

It is an object of this invention to provide an improved class of vulcanisation accelerators. Another object is to provide vulcanisation accelerators which exert a powerful accelerating action at curing temperatures. Other objects will be apparent from the description.

In accordance with the present invention it has been found that amido derivatives of phosphoric and thiophosphoric acids which contain at least one direct phosphor nitrogen binding are excellent vulcanisation accelerators for natural and synthetic vulcanisable elastomers.

In a preferred form of the process of the invention, compounds of the general Formula I $$\begin{array}{c} X \\ \| \\ R_1-P-R_2 \\ | \\ R_3 \end{array}$$

I are used as vulcanisation accelerators. In this formula, X represents an oxygen or sulfur atom and $R_1$ stands for the radical

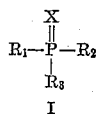

in which $Y_1$ and $Y_2$ each represent either hydrogen or like or different, and if desired substituted, hydrocarbon radicals, or in which $Y_1$ and $Y_2$ together with the adjacent nitrogen atom can form a heterocyclic ring system. Alkyl, cycloalkyl, aryl, and aralkyl radicals are examples of hydrocarbon radicals; examples of heterocyclic ring systems are the ethylene imino, pyrrolidino, piperidino, hexamethylene imino and morpholino radicals.

In the formula indicated above, $R_2$ and $R_3$ can be like or different groups each with one of the meanings indicated under $R_1$, or can if desired be substituted alkyl, cycloalkyl, aryl or aralkyl groups, those radicals different from $R_1$ either being linked directly to the phosphorus atom (P—C-bond) or linked through oxygen or sulfur atoms (P—O—C- or P—S—C-bonds) to the phosphorus atom. Where $R_2$ and $R_3$ are bonded to the phosphorus by way of O atoms or S atoms, each of them can alternatively be a hydrogen atom or a salt-forming cation. $R_2$ and $R_3$ can moreover together form a radical which is bonded by way of $R_2$ and $R_3$ twice to the same or to different phosphorus atoms.

The following compounds are examples of the compounds to be used according to the invention:

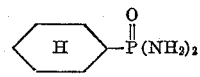

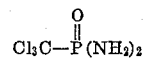

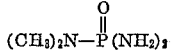

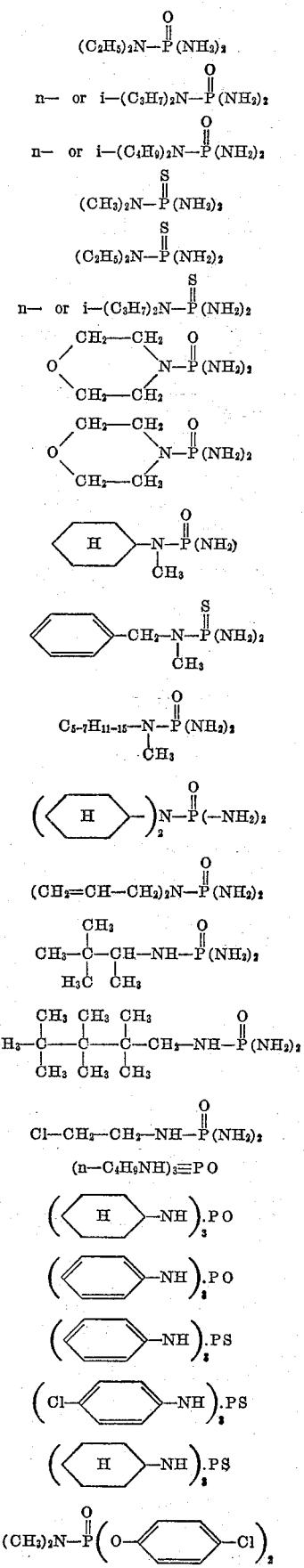

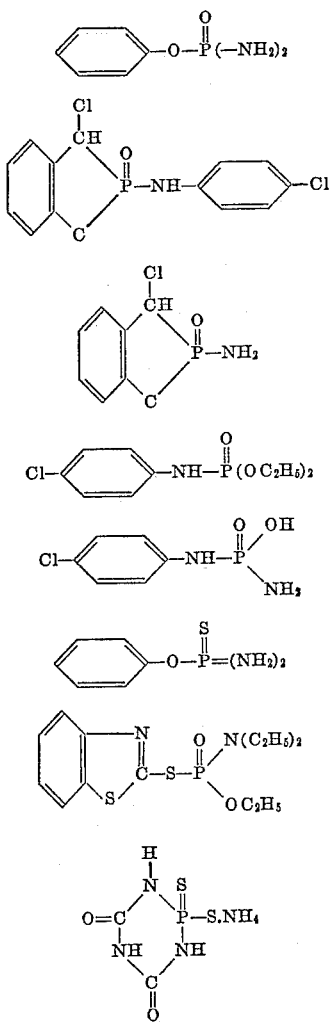

The compounds used according to the invention can be prepared by known processes, for example by the process described by G. M. Kosolapoff at page 278 et seq. in "Organophosphorus Compounds" (1950). The compounds can alternatively be obtained by causing ammonia to act on N-mono-substituted or N-disubstituted amidophosphoric dihalides or amidothiophosphoric acid dihalides.

The compounds in accordance with the invention are used as vulcanisation accelerators in known manner by adding the compounds to the vulcanisable elastomer mixtures and then vulcanising the mass obtained. Generally speaking, good results are produced if the vulcanisation accelerators in accordance with the invention are added in proportions of 0.05 to 5% by weight preferably 0.1 to 2% to the rubber mixtures. It is of course also possible to choose other proportions.

The vulcanisation accelerators in accordance with the invention can alternatively be mixed with other known vulcanisation accelerators, especially those of the mercapto-benzthiazole class, whereby an additional activation is produced in the vulcanisation.

The vulcanisable elastomers for which the accelerators can be used are for example natural rubber or synthetic rubber-like polymers obtained, for example, for instance from conjugated diolefines such as butadiene, dimethyl-butadiene, isoprene and their homologues or copolymers of conjugated diolefines with polymerisable vinyl compounds such as styrene, $\alpha$-methyl-styrene and their substitution products, acrylonitrile, methacrylonitrile, acrylates and methacrylates and similar compounds or copolymers which are obtained from iso-olefines such as isobutylene and its homologues with a small amount of conjugated diolefines. Furthermore they are suitable for polymerisates obtained from chlorobutadiene and its copolymerisates obtained with mono- and/or di-olefines or other polymerisable vinyl compounds. There can be used also co-polymerisates of polymerisable mono-olefines with small amounts of conjugated di-olefines or polymerisates of mono-olefines which contain sulfochloride groups.

The following examples further illustrate the invention without, in any way, limiting it thereto.

EXAMPLE 1

The following mixture with a natural rubber base is prepared on the roller:

|  | Parts |
|---|---|
| Crepe | 50.0 |
| Smoked sheets | 50.0 |
| Zinc oxide | 5.0 |
| Stearic acid | 1.0 |
| Sulfur | 2.5 |

1 part of N,N-dicyclohexyl phosphoric acid triamid is added to this basic mixture for each 100 parts of natural rubber, and then the mixture is vulcanised in a press. The results obtained will be seen from the following table.

Table 1

| Heating | | Tensile strength (kg./cm.²) | Breaking elongation | Load at 600% elongation | Elasticity at 75° C. | Hardness (° Shore) |
|---|---|---|---|---|---|---|
| Temp., °C. | Time, min. | | | | | |
| 110 | 10 | 3 | 740 | 2 | 53 | 17 |
|  | 35 | 6 | 860 | 3 | 52 | 19 |
|  | 80 | 31 | 1,115 | 6 | 52 | 21 |
| 143 | 5 | 42 | 1,085 | 9 | 52 | 22 |
|  | 20 | 155 | 990 | 22 | 61 | 31 |
|  | 60 | 192 | 865 | 40 | 72 | 37 |
|  | 100 | 192 | 850 | 47 | 74 | 39 |

EXAMPLE 2

The following mixture with a base of natural rubber is prepared on the roller:

|  | Parts |
|---|---|
| Smoked sheets | 100.0 |
| Inactive carbon black | 40.0 |
| Zinc oxide | 5.0 |
| Stearic acid | 1.0 |
| Ozokerite | 1.0 |
| Sulfur | 1.5 |

0.7 part of dibenzthiazyl disulfide and 0.3 part of N,N-diethylphosphoric acid triamide are admixed with this basic mixture, per 100 parts of natural rubber. The mixture is then vulcanised in a press and the results thereby obtained will be seen from Table 2.

Table 2

| Heating | | Tensile strength (kg./cm.²) | Breaking elongation | Load at 600% elongation | Elasticity at 75° C. | Hardness (° Shore) |
|---|---|---|---|---|---|---|
| Temp., °C. | Time, min. | | | | | |
| 110 | 10 | 6 | 850 | 3 |  |  |
|  | 30 | 6 | 860 | 3 | 48 | 22 |
|  | 50 | 213 | 750 | 132 | 70 | 46 |
|  | 75 | 248 | 750 | 161 | 72 | 50 |
| 143 | 5 | 84 | 780 | 43 | 57 | 35 |
|  | 10 | 226 | 750 | 134 | 69 | 49 |
|  | 25 | 223 | 725 | 144 | 69 | 50 |
|  | 50 | 202 | 730 | 130 | 68 | 49 |
|  | 75 | 195 | 730 | 124 | 67 | 46 |

By way of comparison, the values which are obtained without the additional accelerator according to the invention, but merely with the addition of 1 part of dibenzothiazyl disulfide to each 100 parts of natural rubber.

| Heating | | Tensile strength (kg./cm.²) | Breaking elongation | Load at 600% elongation | Elasticity at 75° C. | Hardness (° Shore) |
|---|---|---|---|---|---|---|
| Temp., °C. | Time, min. | | | | | |
| 110 | 10 | 6 | 690 | 4 | | |
|  | 30 | 6 | 910 | 4 | | |
|  | 50 | 31 | 740 | 19 | 50 | 29 |
|  | 75 | 118 | 720 | 76 | 61 | 36 |
| 143 | 5 | 75 | 770 | 38 | 55 | 31 |
|  | 10 | 174 | 755 | 99 | 65 | 40 |
|  | 25 | 192 | 760 | 109 | 68 | 44 |
|  | 50 | 186 | 780 | 99 | 67 | 41 |

EXAMPLE 3

The basic mixture indicated in Example 1 has admixed therewith 0.5 part of N,N-diethyl thiophosphoric acid triamide per 100 parts of natural rubber, whereupon the mixture is vulcanised in a press. The results obtained will be seen from Table 3.

*Table 3*

| Heating | | Tensile strength (kg./cm.²) | Breaking elongation | Load at 600% elongation | Elasticity at 75° C. | Hardness (° Shore) |
|---|---|---|---|---|---|---|
| Temp., °C. | Time, min. | | | | | |
| 110 | 35 | 1.5 | 770 | 1 | 53 | 15 |
|  | 80 | 3 | 880 | 2 | 50 | 15 |
| 143 | 20 | 87 | 1,190 | 9 | 50 | 24 |
|  | 40 | 143 | 1,040 | 17 | 60 | 30 |
|  | 60 | 158 | 990 | 20 | 60 | 33 |
|  | 80 | 164 | 945 | 25 | 69 | 35 |

EXAMPLE 4

The basic mixture indicated in Example 1 has added thereto 0.7 part of dibenzothiazide disulfide and 0.3 part of N,N-diethyl thiophosphoric acid triamide per 100 parts of natural rubber, whereupon the mixture is vulcanised in a press. The results will be seen from Table 4.

*Table 4*

| Heating | | Tensile strength (kg./cm.²) | Breaking elongation | Load at 600% elongation | Elasticity at 75° C. | Hardness (° Shore) |
|---|---|---|---|---|---|---|
| Temp., °C. | Time, min. | | | | | |
| 110 | 5 | 6 | 835 | 4 | 54 | 19 |
|  | 20 | 195 | 870 | 47 | 71 | 36 |
|  | 50 | 273 | 790 | 107 | 78 | 45 |
|  | 80 | 260 | 735 | 130 | 79 | 46 |
| 143 | 5 | 198 | 825 | 54 | 74 | 39 |
|  | 20 | 225 | 760 | 93 | 77 | 44 |
|  | 60 | 190 | 770 | 68 | 74 | 42 |
|  | 100 | 202 | 820 | 54 | 74 | 41 |

By way of comparison the values set out below are those obtained without the additional accelerator according to the invention and merely using an addition of 1 part of dibenzothiazyl disulfide to 100 parts of natural rubber.

| Heating | | Tensile strength (kg./cm.²) | Breaking elongation | Load at 600% elongation | Elasticity at 75° C. | Hardness (° Shore) |
|---|---|---|---|---|---|---|
| Temp., °C. | Time, min. | | | | | |
| 110 | 5 | 1.5 | 655 | 1 | | |
|  | 20 | 2 | 850 | 1 | | |
|  | 50 | 2 | 630 | 1 | | |
|  | 80 | 16 | 720 | 8 | | |
| 143 | 5 | 2 | 850 | 1 | | |
|  | 20 | 194 | 790 | 64 | 73 | 40 |
|  | 60 | 182 | 785 | 63 | 72 | 41 |
|  | 100 | 160 | 785 | 56 | 72 | 40 |

EXAMPLE 5

The basic mixture which is indicated in Example 2 has added thereto 0.7 part of dibenzthiazyl disulfide and 0.3 part of N,N',N''-tri-n-butyl phosphoric acid triamide per 100 parts of natural rubber, whereupon the mix is vulcanised in a press. The results obtained will be seen from Table 5.

*Table 5*

| Heating | | Tensile strength (kg./cm.²) | Breaking elongation | Load at 600% elongation | Elasticity at 75° C. | Hardness (° Shore) |
|---|---|---|---|---|---|---|
| Temp., °C. | Time, min. | | | | | |
| 110 | 10 | 6 | 760 | 3 | | |
|  | 30 | 6 | 805 | 3 | | |
|  | 50 | 220 | 745 | 132 | 72 | 47 |
|  | 75 | 245 | 725 | 171 | 73 | 50 |
| 143 | 5 | 28 | 825 | 16 | 54 | 28 |
|  | 10 | 240 | 770 | 143 | 70 | 49 |
|  | 25 | 236 | 730 | 153 | 70 | 50 |
|  | 50 | 217 | 720 | 144 | 70 | 49 |
|  | 75 | 198 | 700 | 141 | 70 | 48 |

EXAMPLE 6

The following mixture with a base of natural rubber is prepared on the roller:

|  | Parts |
|---|---|
| Crepe | 100.0 |
| Chalk | 80.0 |
| Zinc oxide RS | 5.0 |
| Stearic acid | 1.0 |
| Sulfur | 2.5 |

0.8 part of mercaptobenzthiazole and 0.2 part of N,N',N''-tricyclohexyl phosphoric acid triamide are added to this basic mixture per 100 parts of natural rubber and then the mixture is vulcanised in a press. The results are shown in Table 6.

*Table 6*

| Heating | | Tensile strength (kg./cm.²) | Breaking elongation | Load at 600% elongation | Elasticity at 75° C. | Hardness (° Shore) |
|---|---|---|---|---|---|---|
| Temp., °C. | Time, min. | | | | | |
| 110 | 10 | | 870 | | | |
|  | 25 | 155 | 690 | 68 | 60 | 48 |
|  | 50 | 171 | 625 | 114 | 69 | 52 |
| 143 | 5 | 144 | 645 | 77 | 61 | 45 |
|  | 10 | 171 | 625 | 104 | 70 | 53 |
|  | 20 | 159 | 615 | 106 | 70 | 54 |
|  | 40 | 152 | 625 | 94 | 69 | 54 |
|  | 60 | 146 | 620 | 83 | 68 | 51 |

By way of comparison, there are indicated below the values obtained without the additional accelerator according to the invention, but merely using an addition of 0.8 part of mercaptobenzthiazole to 100 parts of natural rubber.

| Heating | | Tensile strength (kg./cm.²) | Breaking elongation | Load at 600% elongation | Elasticity at 75° C. | Hardness (° Shore) |
|---|---|---|---|---|---|---|
| Temp., °C. | Time, min. | | | | | |
| 110 | 10 | | 730 | | | |
|  | 25 | 12 | 705 | 5 | 25 | 16 |
|  | 50 | 96 | 660 | 50 | 46 | 37 |
| 143 | 5 | 55 | 630 | 31 | 39 | 30 |
|  | 10 | 111 | 625 | 71 | 56 | 42 |
|  | 20 | 130 | 635 | 76 | 60 | 46 |
|  | 40 | 121 | 655 | 68 | 59 | 47 |
|  | 60 | 112 | 670 | 62 | 58 | 45 |

EXAMPLE 7

The basic mixture which is indicated in Example 2 has added thereto 0.7 part of dibenzthiazyl disulfide and 0.3 part of N,N',N''-tricyclohexyl thiophosphoric acid triamide per 100 parts of rubber and is then vulcanised in a press. The results are shown in Table 7.

Table 7

| Heating Temp., °C. | Time, min. | Tensile strength (kg./cm.²) | Breaking elongation | Load at 600% elongation | Elasticity at 75° C. | Hardness (° Shore) |
|---|---|---|---|---|---|---|
| 110 | 20 | 3 | 930 | --- | 45 | 20 |
|  | 50 | 150 | 745 | 132 | 72 | 47 |
|  | 75 | 245 | 725 | 171 | 73 | 50 |
| 143 | 5 | 22 | 720 | 9 | 49 | 26 |
|  | 10 | 205 | 740 | 123 | 67 | 46 |
|  | 25 | 214 | 750 | 124 | 68 | 47 |
|  | 50 | 195 | 745 | 115 | 66 | 46 |
|  | 75 | 192 | 745 | 115 | 66 | 45 |

EXAMPLE 8

The basic mixture which is indicated in Example 2 has added thereto 0.7 part of dibenzthiazyl disulfide and 0.3 part of cyclohexyl phosphoric acid diamide per 100 parts of natural rubber and is then vulcanised in a press. The results are shown in Table 8.

Table 8

| Heating Temp., °C. | Time, min. | Tensile strength (kg./cm.²) | Breaking elongation | Load at 600% elongation | Elasticity at 75° C. | Hardness (° Shore) |
|---|---|---|---|---|---|---|
| 110 | 10 | --- | 895 | 3 | 46 | 20 |
|  | 25 | 6 | 955 | 3 | 46 | 21 |
|  | 50 | 143 | 870 | 62 | 51 | 37 |
|  | 75 | 202 | 780 | 109 | 67 | 45 |
| 143 | 5 | 74 | 730 | 40 | 55 | 34 |
|  | 15 | 198 | 755 | 115 | 67 | 44 |
|  | 30 | 198 | 780 | 109 | 67 | 45 |
|  | 50 | 192 | 765 | 107 | 66 | 45 |

EXAMPLE 9

The following mixture with a natural rubber base is prepared on the roller:

| | Parts |
|---|---|
| Smoked sheets | 100.0 |
| Pine tar | 2.5 |
| Active carbon black | 45.0 |
| Zinc oxide | 3.0 |
| Stearic acid | 3.0 |
| Anti-ageing additive | 2.2 |
| Sulfur | 2.8 |
| Paraffin | 1.5 |

0.6 part of a compound of the formula

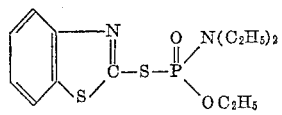

is added to this basic mixture per 100 parts of natural rubber, whereupon the mixture is vulcanised in a press. The results are shown in Table 9.

Table 9

| Heating Temp., °C. | Time, min. | Tensile strength (kg./cm.²) | Breaking elongation | Load at 600% elongation | Elasticity at 75° C. | Hardness (° Shore) |
|---|---|---|---|---|---|---|
| 110 | 10 | 18 | 815 | 9 | 33 | 30 |
|  | 25 | 27 | 835 | 14 | 33 | 31 |
|  | 50 | 80 | 735 | 31 | 38 | 40 |
|  | 75 | 124 | 675 | 54 | 41 | 45 |
| 143 | 5 | 45 | 705 | 21 | 36 | 35 |
|  | 10 | 114 | 670 | 56 | 39 | 45 |
|  | 20 | 180 | 590 | 109 | 50 | 52 |
|  | 40 | 229 | 550 | 153 | 54 | 60 |
|  | 60 | 210 | 550 | 149 | 54 | 60 |
|  | 80 | 195 | 540 | 149 | 54 | 59 |

EXAMPLE 10

The following mixture with a natural rubber base is prepared on the roller:

| | Parts |
|---|---|
| Smoked sheets | 50.0 |
| Crepe | 50.0 |
| Zinc oxide | 5.0 |
| Stearic acid | 1.0 |
| Barium sulfate | 50.0 |
| Sulfur | 2.5 |

0.7 part of dibenzothiazyl disulfide and 0.3 part of phosphoric acid monophenyl ester diamide are added to this basic mixture per 100 parts of natural rubber. The mixture is then vulcanised in a press. The results are shown in Table 10.

Table 10

| Heating Temp., °C. | Time, min. | Tensile strength (kg./cm.²) | Breaking elongation | Load at 600% elongation | Elasticity at 75° C. | Hardness (° Shore) |
|---|---|---|---|---|---|---|
| 110 | 10 | --- | 830 | --- | --- | --- |
|  | 35 | 112 | 825 | 23 | 58 | 33 |
|  | 80 | 233 | 785 | 65 | 74 | 46 |
| 143 | 5 | 156 | 840 | 31 | 73 | 37 |
|  | 10 | 220 | 810 | 53 | 72 | 44 |
|  | 20 | 217 | 765 | 62 | 73 | 47 |
|  | 60 | 189 | 785 | 48 | 72 | 46 |
|  | 100 | 159 | 775 | 39 | 71 | 44 |

By way of comparison, the following values are obtained without the additional accelerator according to the invention, using only an addition of 0.7 part of dibenzothiazyl disulfide per 100 parts of natural rubber.

| Heating Temp., °C. | Time, min. | Tensile strength (kg./cm.²) | Breaking elongation | Load at 600% elongation | Elasticity at 75° C. | Hardness (° Shore) |
|---|---|---|---|---|---|---|
| 110 | 10 | --- | 710 | --- | --- | --- |
|  | 35 | --- | 715 | --- | --- | --- |
|  | 80 | 16 | 755 | 3 | --- | --- |
| 143 | 5 | --- | 715 | --- | --- | --- |
|  | 10 | 79 | 815 | 19 | 55 | 32 |
|  | 20 | 177 | 790 | 45 | 70 | 43 |
|  | 60 | 170 | 790 | 42 | 71 | 45 |
|  | 100 | 150 | 795 | 34 | 70 | 44 |

EXAMPLE 11

0.7 part of dibenzothiazyl disulfide and 0.3 part of N,N-dibutyl phosphoric acid triamide are added to the basic mixture indicated in Example 10 and per 100 parts of natural rubber, after which the mix is vulcanised in a press. The results are shown in Table 11.

Table 11

| Heating Temp., °C. | Time, min. | Tensile strength (kg./cm.²) | Breaking elongation | Load at 600% elongation | Elasticity at 75° C. | Hardness (° Shore) |
|---|---|---|---|---|---|---|
| 110 | 35 | --- | 760 | --- | --- | --- |
|  | 80 | 180 | 740 | 56 | 63 | 45 |
| 143 | 5 | 21 | 790 | 6 | 49 | 19 |
|  | 10 | 211 | 780 | 57 | 73 | 46 |
|  | 20 | 212 | 710 | 78 | 77 | 50 |
|  | 60 | 190 | 735 | 56 | 76 | 48 |
|  | 100 | 177 | 750 | 47 | 74 | 47 |

EXAMPLE 12

The following mixture containing a polymer of 2-chloro-1,3-butadiene is prepared on the roller:

| | Parts |
|---|---|
| Slowly crystallising chlorobutadiene polymer | 100.0 |
| Zinc oxide | 3.0 |
| Light magnesium oxide | 4.0 |
| Inactive carbon black | 30.0 |
| Coloring anti-ageing additive | 1.0 |
| Stearic acid | 3.0 |

0.5 part of N,N-diethyl thiophosphoric acid triamide is added to 100 parts of elastomer and the latter is then vulcanised in a press. The results are shown in Table 12.

*Table 12*

| Heating | | Tensile strength (kg./cm.²) | Breaking elongation | Load at 600% elongation | Elasticity at 75° C. | Hardness (° Shore) |
|---|---|---|---|---|---|---|
| Temp., °C. | Time, min. | | | | | |
| 110 | 10 | 20 | 1,440 | 4 | | |
|  | 25 | 62 | 1,225 | 7 | 39 | |
|  | 50 | 112 | 1,100 | 12 | 41 | 44 |
| 151 | 5 | 152 | 900 | 15 | 41 | 50 |
|  | 10 | 167 | 820 | 34 | 45 | 51 |
|  | 20 | 162 | 730 | 63 | 50 | 53 |
|  | 35 | 174 | 700 | 75 | 52 | 54 |
|  | 50 | 174 | 675 | 81 | 54 | 55 |

EXAMPLE 13

The basic mixture which is indicated in Example 12 has added thereto 1 part of N,N-dimethyl phosphoric acid triamide per 100 parts of elastomer, whereupon the mix is vulcanised in a press. The results are shown in Table 13.

*Table 13*

| Heating | | Tensile strength (kg./cm.²) | Breaking elongation | Load at 600% elongation | Elasticity at 75° C. | Hardness (° Shore) |
|---|---|---|---|---|---|---|
| Temp., °C. | Time, min. | | | | | |
| 110 | 10 | 2 | 1,485 | 1 | | |
|  | 25 | 12 | 1,475 | 3 | | |
|  | 50 | 65 | 1,170 | 10 | 47 | 24 |
| 151 | 5 | 167 | 850 | 50 | 56 | 45 |
|  | 10 | 164 | 650 | 77 | 59 | 51 |
|  | 20 | 166 | 610 | 92 | 60 | 54 |
|  | 40 | 171 | 620 | 93 | 60 | 54 |
|  | 75 | 171 | 615 | 94 | 60 | 54 |

EXAMPLE 14

0.5 part of N-methyl-N-benzylthiophosphoric acid triamide is added to the basic mixture indicated in Example 12 and to 100 parts of elastomer, whereupon the mixture is vulcanised in a press. The results are shown in Table 14.

*Table 14*

| Heating | | Tensile strength (kg./cm.²) | Breaking elongation | Load at 600% elongation | Elasticity at 75° C. | Hardness (° Shore) |
|---|---|---|---|---|---|---|
| Temp., °C. | Time, min. | | | | | |
| 110 | 10 | 15 | 1,500 | 4 | | |
|  | 25 | 40 | 1,205 | 6 | | |
|  | 50 | 75 | 1,180 | 14 | 41 | 40 |
| 151 | 5 | 138 | 980 | 37 | 44 | 49 |
|  | 10 | 162 | 820 | 49 | 48 | 51 |
|  | 20 | 174 | 720 | 68 | 50 | 52 |
|  | 35 | 171 | 700 | 73 | 51 | 54 |
|  | 50 | 180 | 695 | 78 | 52 | 55 |

EXAMPLE 15

The basic mixture which is indicated in Example 12 has added thereto 0.5 part of N,N',N''-triphenyl thiophosphoric acid triamide per 100 parts of elastomer, whereupon the mix is vulcanised in a press. The results are shown in Table 15.

*Table 15*

| Heating | | Tensile strength (kg./cm.²) | Breaking elongation | Load at 600% elongation | Elasticity at 75° C. | Hardness (° Shore) |
|---|---|---|---|---|---|---|
| Temp., °C. | Time, min. | | | | | |
| 110 | 10 | 21 | 1,340 | 4 | | |
|  | 25 | 51 | 1,290 | 8 | 42 | 36 |
|  | 50 | 105 | 1,170 | 19 | 46 | 45 |
| 151 | 5 | 87 | 980 | 21 | 43 | 45 |
|  | 10 | 123 | 915 | 28 | 45 | 46 |
|  | 20 | 147 | 840 | 44 | 49 | 48 |
|  | 35 | 152 | 795 | 47 | 49 | 50 |
|  | 50 | 150 | 745 | 52 | 50 | 50 |

Instead of the N,N',N''-triphenyl thiophosphoric acid triamide there can be used also the N,N',N''-triphenylphosphoric acid triamide, N,N',N''-p-chlorophenyl thiophosphoric acid triamide, N,N-dimethylamido phosphoric acid-bis-p-chlorophenylester, diamido phosphoric acid phenyl ester, N-p-chlorophenyl amido phosphoric acid diethyl ester, N-p-chlorophenyl diamido phosphoric acid, diamido thiophosphoric acid phenyl ester.

EXAMPLE 16

The slowly crystallising chlorobutadiene polymer in the basic mixture indicated in Example 12 is replaced by a quickly crystallising chlorobutadiene polymer and 0.5 part of N,N-diethyl thiophosphoric acid triamide is added to the basic mixture, which is then vulcanised in a press. The results are shown in Table 16.

*Table 16*

| Heating | | Tensile strength (kg./cm.²) | Breaking elongation | Load at 600% elongation | Elasticity at 75° C. | Hardness (° Shore) |
|---|---|---|---|---|---|---|
| Temp., °C. | Time, min. | | | | | |
| 110 | 5 | 90 | 895 | 37 | 40 | 64 |
|  | 10 | 121 | 1,125 | 37 | 47 | 59 |
|  | 25 | 167 | 1,120 | 49 | 54 | 49 |
|  | 50 | 168 | 905 | 60 | 54 | 53 |
| 151 | 5 | 177 | 890 | 56 | 55 | 49 |
|  | 10 | 183 | 780 | 68 | 57 | 51 |
|  | 20 | 180 | 715 | 75 | 59 | 53 |
|  | 35 | 177 | 640 | 81 | 59 | 54 |
|  | 55 | 177 | 645 | 89 | 60 | 54 |

Instead of the N,N-diethyl thiophosphoric acid triamide there can be used also the N,N-dimethyl thiophosphoric acid triamide or the n- or i-N,N-dipropyl thiophosphoric acid triamide.

EXAMPLE 17

The following mixture with a base of butyl rubber is prepared on the roller:

| | Parts |
|---|---|
| Butyl rubber | 100.0 |
| Zinc oxide | 5.0 |
| Active carbon black | 20.0 |
| Spindle oil | 3.0 |
| Inactive carbon black | 20.0 |
| Sulfur | 2.0 |

1 part of N,N-diethyl thiophosphoric acid triamide is added to this basic mixture per 100 parts of elastomer and the mixture is then vulcanised in a press. The results are shown in Table 17.

*Table 17*

| Heating | | Tensile strength (kg./cm.²) | Breaking elongation | Load at 600% elongation | Elasticity at 75° C. | Hardness (° Shore) |
|---|---|---|---|---|---|---|
| Temp., °C. | Time, min. | | | | | |
| 110 | 25 | 3 | 1,500 | | | 25 |
|  | 50 | 3 | 1,500 | | | 30 |
| 151 | 10 | 27 | 1,390 | 6 | 28 | 35 |
|  | 20 | 81 | 1,070 | 11 | 29 | 36 |
|  | 35 | 115 | 1,030 | 20 | 31 | 39 |
|  | 85 | 123 | 875 | 34 | 37 | 42 |
|  | 120 | 132 | 870 | 40 | 40 | 42 |

EXAMPLE 18

The following mixture with a base of chlorosulfonated polyethylene, known under the trade name of "Hypalon," was prepared on the roller:

| | Parts |
|---|---|
| "Hypalon" 20 | 100.0 |
| "Staybelite Resin" (hydrogenated rosin) | 2.5 |
| Inactive carbon black | 30.0 |
| "Ingraplast SRL" (a paraffinic softener) | 10.0 |
| Litharge | 40.0 |

1.5 parts of N,N-diethyl thiophosphoric acid triamide are added to 100 parts of elastomer and the mixture is then vulcanised in a press. The results are shown in Table 18.

Table 18

| Heating | | Tensile strength (kg./cm.²) | Breaking elongation | Load at 600% elongation | Elasticity at 75° C. | Hardness (° Shore) |
|---|---|---|---|---|---|---|
| Temp., °C. | Time, min. | | | | | |
| 127 | 10 | 135 | 380 | 101 | 49 | 61 |
|  | 25 | 147 | 395 | 103 | 49 | 61 |
|  | 50 | 144 | 365 | 111 | 49 | 61 |
| 155 | 10 | 150 | 380 | 101 | 48 | 61 |
|  | 25 | 150 | 355 | 116 | 48 | 61 |
|  | 40 | 147 | 340 | 120 | 48 | 61 |
|  | 50 | 138 | 320 | 122 | 49 | 60 |
|  | 60 | 153 | 320 | 128 | 50 | 60 |

For comparison purpose, the following are the values obtained without the addition of the N,N-diethyl thiophosphoric acid triamide.

| Heating | | Tensile strength (kg./cm.²) | Breaking elongation | Load at 600% elongation | Elasticity at 75° C. | Hardness (° Shore) |
|---|---|---|---|---|---|---|
| Temp., °C. | Time, min. | | | | | |
| 127 | 10 | 16 | 420 | 11 | 33 | 41 |
|  | 25 | 20 | 455 | 14 | 37 | 44 |
|  | 50 | 31 | 430 | 17 | 37 | 47 |
| 155 | 10 | 26 | 435 | 17 | 38 | 47 |
|  | 25 | 43 | 445 | 29 | 39 | 51 |
|  | 40 | 50 | 390 | 35 | 40 | 53 |
|  | 50 | 66 | 400 | 48 | 40 | 56 |
|  | 60 | 81 | 415 | 55 | 43 | 58 |

EXAMPLE 19

The following mixture with a base of a co-polymer of acrylonitrile and butadiene, with which 28% of acrylonitrile were used, is prepared on the roller:

| | Parts |
|---|---|
| Co-polymer | 100.0 |
| Active carbon black | 5.0 |
| Zinc oxide | 5.0 |
| Plasticiser | 5.0 |
| Stearic acid | 1.0 |
| Anti-ageing additive | 1.5 |

1.0 part of N,N-diethyl thiophosphoric acid triamide and 0.5 part of dibenzothiazyl disulfide are then added per 100.0 parts of the co-polymer and then vulcanisation is carried out in a press. The results are shown in Table 19.

Table 19

| Heating | | Tensile strength (kg./cm.²) | Breaking elongation | Load at 600% elongation | Elasticity at 75° C. | Hardness (° Shore) |
|---|---|---|---|---|---|---|
| Temp., °C. | Time, min. | | | | | |
| 111 | 10 | 53 | 870 | 19 | 40 | 57 |
|  | 25 | 153 | 756 | 46 | 41 | 63 |
|  | 50 | 204 | 695 | 71 | 43 | 65 |
| 138 | 5 | 160 | 750 | 50 | 40 | 64 |
|  | 10 | 204 | 690 | 69 | 42 | 65 |
|  | 25 | 222 | 675 | 90 | 43 | 66 |
|  | 45 | 228 | 530 | 104 | 45 | 68 |
|  | 120 | 252 | 470 | 131 | 46 | 70 |

For comparison purposes, the following are the values obtained without the addition of N,N-diethyl thiophosphoric acid triamide, using merely an addition of 1.5 parts of dibenzothiazyl disulfide.

| Heating | | Tensile strength (kg./cm.²) | Breaking elongation | Load at 600% elongation | Elasticity at 75° C. | Hardness (° Shore) |
|---|---|---|---|---|---|---|
| Temp., °C. | Time, min. | | | | | |
| 111 | 10 | 8 | 475 | 7 | | |
|  | 25 | 8 | 690 | 8 | | |
|  | 50 | 11 | 900 | 9 | | |
| 138 | 5 | 8 | 525 | 8 | | |
|  | 10 | 48 | 675 | 19 | 39 | 59 |
|  | 25 | 213 | 560 | 90 | 42 | 66 |
|  | 43 | 220 | 500 | 110 | 43 | 70 |
|  | 120 | 226 | 435 | 128 | 46 | 71 |

EXAMPLE 20

The following mixture with a basis of cold rubber is prepared on the roller:

| | Parts |
|---|---|
| Cold rubber | 100.0 |
| Hydrocarbon plasticiser | 6.5 |
| Active carbon black | 45.0 |
| Active zinc oxide | 5.0 |
| Stearic acid | 2.0 |
| Paraffin | 0.75 |
| Anti-ageing additive | 1.5 |
| Sulfur | 1.8 |

0.42 gram of dibenzothiazyl disulfide and 0.83 gram of N,N-diethyl thiophosphoric acid triamide are added per 100 parts of elastomer, and then the mixture is vulcanised in a press, the results being shown in Table 20.

Table 20

| Heating | | Tensile strength (kg./cm.²) | Breaking elongation | Load at 600% elongation | Elasticity at 75° C. | Hardness (° Shore) |
|---|---|---|---|---|---|---|
| Temp., °C. | Time, min. | | | | | |
| 111 | 10 | 6 | 280 | | | |
|  | 25 | 6 | 400 | 8 | | |
|  | 50 | 30 | 750 | 18 | 25 | 64 |
| 143 | 10 | 102 | 750 | 42 | 25 | 66 |
|  | 20 | 203 | 425 | 134 | 25 | 74 |
|  | 30 | 206 | 395 | 155 | 25 | 75 |
|  | 40 | 216 | 375 | 167 | 24 | 76 |
|  | 50 | 210 | 350 | 169 | 24 | 76 |
|  | 120 | 186 | 315 | | 24 | 76 |

Instead of the N,N-diethyl thiophosphoric acid triamide there can be used also the N,N-dimethyl phosphoric acid triamide, the n- or i-N,N-dipropyl phosphoric acid triamide, N-cyclohexyl-N-methyl phosphoric acid triamide, N-heptyl-N-methyl phosphoric acid triamide, morpholido-phosphoric acid diamide, morpholido thiophosphoric acid diamide, N,N-diallyl phosphoric acid diamide, N-1,2,2-trimethyl propylphosphoric acid triamide, N-2,2,3,3,4,4-hexamethyl propyl phosphoric acid triamide, N-2-chloroethyl phosphoric acid triamide or a compound of the following formulae:

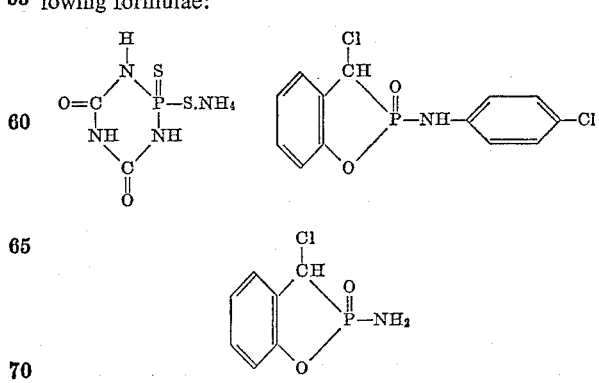

We claim:

1. In the process of sulfur-vulcanizing an elastomer by curing it in the presence of 0.5–5% by weight of a vulcanization accelerator, said elastomer being selected from the group consisting of natural rubber, homopolymers of conjugated diolefins, and copolymers of conjugated diolefins and copolymerizable monovinyl compounds, the improvement comprising mixing with said elastomer, a vulcanization accelerator of the formula:

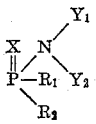

wherein X represents an atom selected from the group consisting of oxygen and sulfur, $Y_1$ and $Y_2$ are selected from a group consisting of hydrogen and a hydrocarbon radical containing up to 9 carbon atoms, and wherein Y and $Y_1$ taken together can form with the adjacent nitrogen atom a heterocyclic ring system selected from one of the following groups:

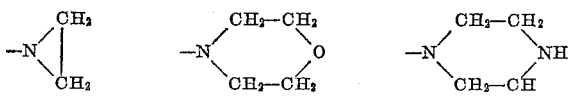

and wherein $R_1$ and $R_2$ are individually selected from the group consisting of (a)

wherein $Y_1$ and $Y_2$ are as defined above, and (b) a hydrocarbon radical containing up to 6 carbon atoms, a hydrocarbon oxy radical containing up to 6 carbon atoms, and a hydrocarbon thia radical containing up to 6 carbon atoms; and vulcanizing said mixture.

2. As a novel composition, an elastomer which has been vulcanized in the presence of 0.5–5% by weight of a novel vulcanization accelerator, the latter having the formula:

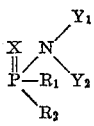

wherein X represents an atom selected from the group consisting of oxygen and sulfur, $Y_1$ and $Y_2$ are selected from the group consisting of hydrogen and a hydrocarbon radical containing up to 9 carbon atoms, and wherein Y and $Y_1$ taken together can form with the adjacent nitrogen atom a heterocyclic ring system selected from one of the following groups:

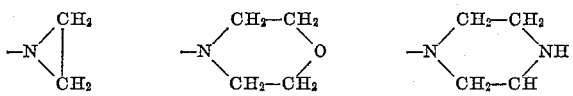

and wherein $R_1$ and $R_2$ are individually selected from the group consisting of (a)

wherein $Y_1$ and $Y_2$ are as defined above, and (b) a hydrocarbon radical containing up to 6 carbon atoms, a hydrocarbon oxy radical containing up to 6 carbon atoms, and a hydrocarbon thia radical containing up to 6 carbon atoms; said elastomer being selected from the group consisting of natural rubber, homopolymers of conjugated diolefins, and copolymers of conjugated diolefins and copolymerizable monovinyl compounds.

3. Composition of claim 2 wherein said elastomer contains 0.1–2% by weight of said accelerator.

4. Process of claim 2 wherein the accelerator is N,N-dicyclohexyl phosphoric acid triamide.

5. Process of claim 2 wherein the accelerator is N,N-dimethyl phosphoric acid triamide.

6. Process of claim 2 wherein the accelerator is N,N-diethyl phosphoric acid triamide.

7. Process of claim 2 wherein the accelerator is N,N-diethyl thiophosphoric acid triamide.

8. In the process of metal-vulcanizing an elastomer by curing it in the presence of 0.5–5% by weight of a vulcanization accelerator, said elastomer being selected from the group consisting of homopolymers of conjugated chlorodiolefins, copolymers of chlorodiolefins and copolymerizable monovinyl compounds, and homopolymers of monoolefins which contain sulfochloride groups, the improvement comprising mixing with said elastomer a vulcanization accelerator of the formula:

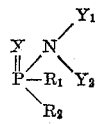

wherein X represents an atom selected from the group consisting of oxygen and sulfur, $Y_1$ and $Y_2$ are selected from the group consisting of hydrogen and a hydrocarbon radical containing up to 9 carbon atoms, and wherein Y and $Y_1$ taken together can form with the adjacent nitrogen atom a heterocyclic ring system selected from one of the following groups:

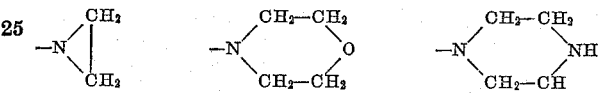

and wherein $R_1$ and $R_2$ are individually selected from the group consisting of (a)

wherein $Y_1$ and $Y_2$ are as defined above, and (b) a hydrocarbon radical containing up to 6 carbon atoms, a hydrocarbon oxy radical containing up to 6 carbon atoms, and a hydrocarbon thia radical containing up to 6 carbon atoms; and vulcanizing said mixture.

9. As a novel composition, an elastomer which has been vulcanized in the presence of 0.5–5% by weight of a novel vulcanization accelerator, the latter having the formula:

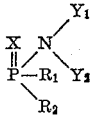

wherein X represents an atom selected from the group consisting of oxygen and sulfur, $Y_1$ and $Y_2$ are selected from the group consisting of hydrogen and a hydrocarbon radical containing up to 9 carbon atoms, and wherein Y and $Y_1$ taken together can form with the adjacent nitrogen atom a heterocyclic ring system selected from one of the following groups:

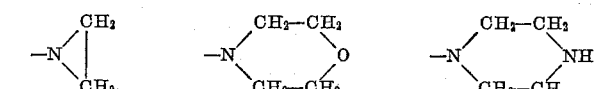

and wherein $R_1$ and $R_2$ are individually selected from the group consisting of (a)

wherein $Y_1$ and $Y_2$ are as defined above, and (b) a hydrocarbon radical containing up to 6 carbon atoms, a hydrocarbon oxy radical containing up to 6 carbon atoms, and a hydrocarbon thia radical containing up to 6 carbon atoms; said elastomer being selected from the group consisting of homopolymers of conjugated chlorodiolefins, copolymers of chlorodiolefins and copolymerizable monovinyl compounds, and homopolymers of monoolefins which contain sulfochloride groups.

10. Composition of claim 9 wherein said elastomer contains 0.1–2% by weight of said accelerator.

11. Process of claim 9 wherein the accelerator is N,N-dicyclohexyl phosphoric acid triamide.

12. Process of claim 9 wherein the accelerator is N,N-dimethyl phosphoric acid triamide.

13. Process of claim 9 wherein the accelerator is N,N-diethyl phosphoric acid triamide.

14. Process of claim 9 wherein the accelerator is N,N-diethyl thiophosphoric acid triamide.

References Cited in the file of this patent

UNITED STATES PATENTS

| | | |
|---|---|---|
| 1,867,631 | Romieux et al. | July 19, 1930 |
| 1,990,610 | Meis | Feb. 12, 1935 |